US005601797A

United States Patent [19]
Gentry

[11] Patent Number: 5,601,797
[45] Date of Patent: Feb. 11, 1997

[54] LIQUID-PHASE CATALYST-ASSEMBLY FOR CHEMICAL PROCESS TOWER

[75] Inventor: Joseph C. Gentry, Houston, Tex.

[73] Assignee: Glitsch, Inc., Dallas, Tex.

[21] Appl. No.: 587,558

[22] Filed: Jan. 17, 1996

Related U.S. Application Data

[63] Continuation of Ser. No. 206,748, Mar. 4, 1994, abandoned, which is a continuation-in-part of Ser. No. 132,059, Oct. 5, 1993, Pat. No. 5,389,343, which is a continuation-in-part of Ser. No. 927,749, Aug. 10, 1992, Pat. No. 5,277,847.

[51] Int. Cl.$^6$ .................................................. C01G 1/00
[52] U.S. Cl. ........................ 423/659; 422/190; 422/191; 423/DIG. 13
[58] Field of Search ........................ 423/659, DIG. 13; 422/190, 191

[56] References Cited

U.S. PATENT DOCUMENTS

| | | |
|---|---|---|
| 2,403,672 | 7/1946 | Matuszak . |
| 3,091,586 | 5/1963 | Pappas et al. . |
| 3,121,124 | 2/1964 | Verdol . |
| 3,170,000 | 2/1965 | Verdol . |
| 3,214,247 | 10/1965 | Broughton . |
| 3,270,081 | 8/1966 | Verdol et al. . |
| 3,317,593 | 5/1967 | Enk et al. . |
| 3,410,540 | 11/1968 | Bruckert . |
| 3,531,539 | 9/1970 | Tidwell . |
| 3,556,736 | 1/1971 | Boyd . |
| 3,629,478 | 12/1971 | Haunschild . |
| 3,634,534 | 1/1972 | Haunschild . |
| 3,726,942 | 4/1973 | Louder . |
| 3,825,603 | 7/1974 | Massie . |
| 3,846,088 | 11/1974 | Brown . |
| 3,940,450 | 2/1976 | Lee . |
| 3,958,952 | 5/1976 | van Ginneken . |
| 3,959,419 | 5/1976 | Kitterman . |
| 4,026,674 | 5/1977 | McDonald .............................. 423/659 |
| 4,027,476 | 6/1977 | Schmidt . |
| 4,100,220 | 7/1978 | Bowman et al. . |
| 4,108,218 | 8/1978 | Estes et al. . |
| 4,198,530 | 4/1980 | Wentzheimer et al. . |
| 4,215,011 | 7/1980 | Smith, Jr. . |
| 4,225,562 | 9/1980 | Anderson . |
| 4,232,177 | 11/1980 | Smith, Jr. . |
| 4,242,530 | 12/1980 | Smith, Jr. . |
| 4,275,021 | 6/1981 | Kirkpatrick et al. . |
| 4,302,356 | 11/1981 | Smith, Jr. . |
| 4,307,254 | 12/1981 | Smith, Jr. . |
| 4,308,233 | 12/1981 | Narumiya et al. . |
| 4,336,407 | 6/1982 | Smith, Jr. . |
| 4,443,559 | 4/1984 | Smith, Jr. . |
| 4,504,426 | 3/1985 | Chuang et al. . |
| 4,526,757 | 7/1985 | Gupta ........................................ 423/659 |

(List continued on next page.)

FOREIGN PATENT DOCUMENTS

| | | |
|---|---|---|
| 0302336A1 | 7/1988 | European Pat. Off. . |
| 0332525A1 | 3/1989 | European Pat. Off. . |
| 1310732 | 12/1989 | Japan . |
| 2096603 | 3/1982 | United Kingdom . |
| WO-A-9319031 | 9/1993 | WIPO . |

OTHER PUBLICATIONS

Jean–Luc Nocca, et al., Special Report "Diversify Process Strategies for Reformulated Gasoline", Hart's Fuel Reformulation, vol. 4, No. 5, Sep./Oct. 1994, p. 19, col. 2.

*Primary Examiner*—Wayne Langel
*Attorney, Agent, or Firm*—Jenkens & Gilchrist, A Professional Corporation

[57] ABSTRACT

An improved catalyst assembly for vapor/liquid contact towers. Catalyst media used to promote chemical reactions is secured substantially in the liquid phase of the tower, such as in the lower portion thereof for improving mass transfer efficiency. Unlike previous process tower assemblies, wherein distillation in conjunction with chemical reaction occurs in the vapor phase or in a mixed phase, the present invention substantially confines the reaction step to the liquid phase. In this manner, the reaction is less obstructive to vapor flow within the tower, promoting better mixing and diffusion of the feed components.

3 Claims, 2 Drawing Sheets

U.S. PATENT DOCUMENTS

| | | |
|---|---|---|
| 4,543,219 | 9/1985 | Yamato et al. . |
| 4,550,000 | 10/1985 | Bentham . |
| 4,551,325 | 11/1985 | Alesandrini et al. ................... 423/659 |
| 4,597,916 | 7/1986 | Chen . |
| 4,603,022 | 7/1986 | Yoneda et al. . |
| 4,604,247 | 8/1986 | Chen et al. . |
| 4,693,807 | 9/1987 | Westerman et al. .................... 423/659 |
| 4,956,127 | 9/1990 | Binkley et al. . |
| 5,011,675 | 4/1991 | Haure et al. ............................ 423/659 |
| 5,277,847 | 1/1994 | Gentry et al. . |

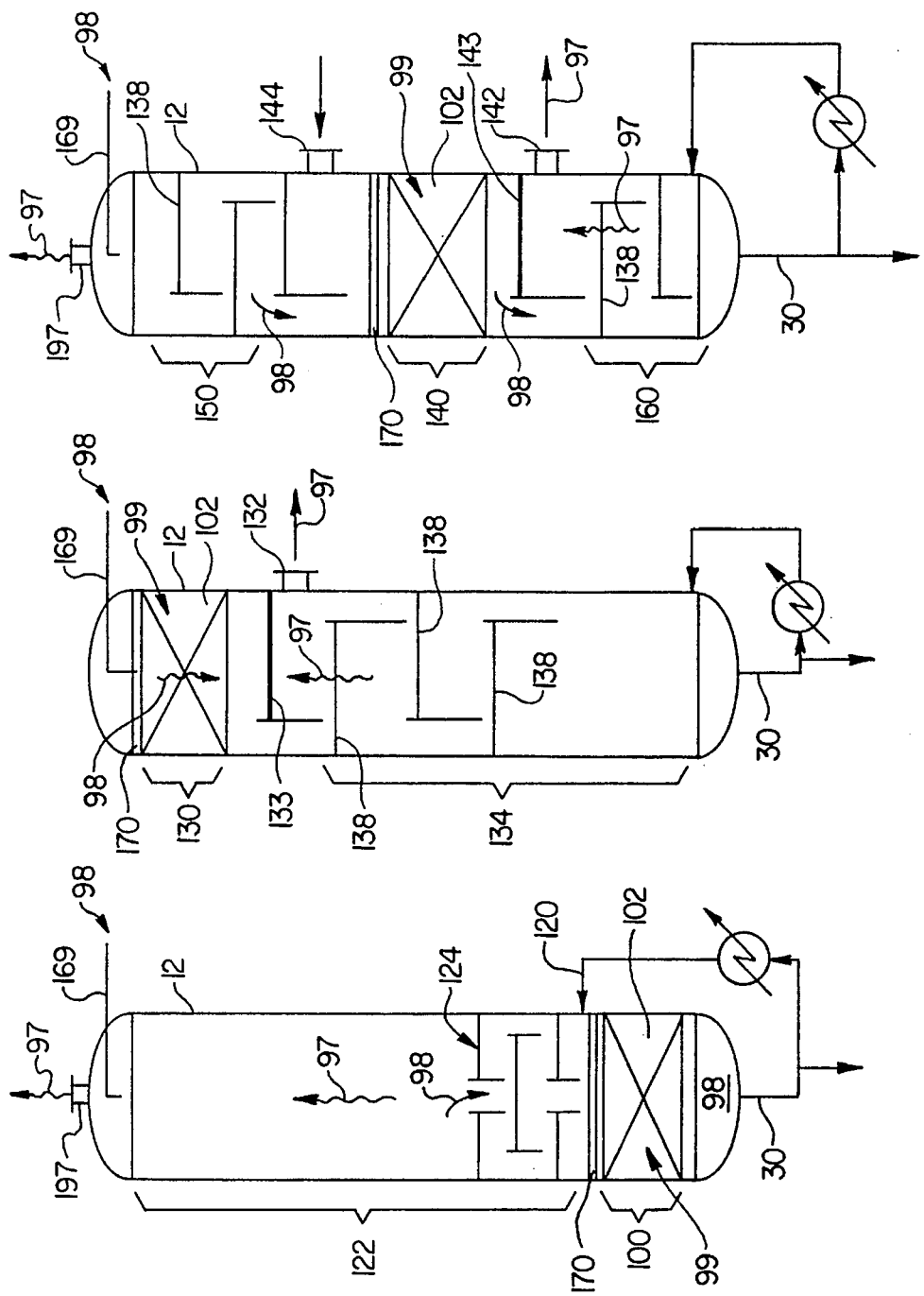

LIQUID-PHASE CATALYST-ASSEMBLY FOR CHEMICAL PROCESS TOWER

This application is a continuation of application Ser. No. 08/206,748 filed on Mar. 4, 1994, abandoned, which is a continuation-in-part of application Ser. No. 08/132,059 filed Oct. 5, 1993, U.S. Pat. No. 5,389.343, which is a continuation-in-part of application Ser. No. 07/927,749 filed Aug. 10, 1992, U.S. Pat. No. 5,277,847.

BACKGROUND OF THE INVENTION

1. Field of the Invention

The present invention pertains to chemical process towers and, more particularly, to an improved catalyst assembly for enhancement of liquid-phase tower operation.

2. History of the Prior Art

Distillation columns are utilized to separate selected components from a multicomponent stream. Generally, such gas-liquid contact columns utilize either trays, packing or combinations thereof. In recent years the trend has been to replace the so-called "bubble caps" by sieve and valve trays in most tray column designs, and the popularity of packed columns, either random (dumped) or structured packing have been utilized in combination with the trays in order to effect improved separation of the components in the stream.

Successful fractionation in the column is dependent upon intimate contact between liquid and vapor phases. Some vapor and liquid contact devices, such as trays, are characterized by relatively high pressure drop and relatively high liquid hold-up. Another type of vapor and liquid contact apparatus, namely structured high-efficiency packing, has also become popular for certain applications. Such packing is energy efficient, because it has low pressure drop and low liquid hold-up. However, these very properties at times make columns equipped with structured packing difficult to operate in a stable, consistent manner. Moreover, many applications simply require the use of trays.

Fractionation column trays come in two configurations: cross-flow and counter flow. The trays generally consist of a solid tray or deck having a plurality of apertures and are installed on support rings within the tower. In cross-flow trays, vapor ascends through the apertures and contacts the liquid moving across the tray through the "active" area thereof. It is in this area liquid and vapor mix and fractionation occurs. The liquid is directed onto the tray by means of a vertical channel from the tray above. This channel is referred to as the Inlet Downcomer. The liquid moves across the tray and exits through a similar channel referred to as the Exit Downcomer. Such downcomers are located where there is a sufficient volume of liquid to effect a liquid-phase, chemical reaction, in the case of catalytic distillation. The location of the downcomers determine the flow pattern of the liquid. If there are two Inlet Downcomers and the liquid is split into two streams over each tray, it is called a two-pass tray. If there is only one Inlet and one Outlet Downcomer on opposite sides of the tray, it is called a single-pass tray. For two or more passes, the tray is often referred to as a multipass tray. The number of passes generally increases as the required (design) liquid rate increases. It is the active area of the tray, however, which is of critical concern.

Not all areas of a tray are active for vapor-liquid contact. For example, the area under the Inlet Downcomer is generally a solid region. To attempt to gain more area of the tray for vapor/liquid contact, the downcomers are often sloped. The maximum vapor/liquid handling capacity of the tray generally increases with an increase in the active or Bubbling Area. There is, however, a limit as to how far one can slope the downcomer(s) in order to increase the Bubbling Area, otherwise the channel will become too small. This can restrict the flow of the liquid and/or restrict the disengagement of vapors retained in the liquid or generated in the downcomers, cause liquid to back up in the downcomer, and thus prematurely limit the normal maximum vapor/liquid handling capacity of the tray.

A variation in design for increasing the Bubbling Area and hence vapor/liquid handling capacity is a Multiple Downcomer (MD) tray. There is usually a plurality of box shaped vertical channels installed in a symmetrical pattern across the tray to direct liquid onto and off of the tray. The downcomers do not extend all the way to the tray below but stop short of the tray by a predetermined distance which is limited by a sufficient space to permit disengagement of any vapor retained in the liquid entering the Exit Downcomer. The downcomer pattern is rotated 90 degrees between successive trays. The bottom of the boxes is solid except for slots that direct the liquid onto the Bubbling Area of the tray below, in between the outlet downcomers of said tray.

The technology of gas-liquid contact addresses many performance issues. Examples are seen in several prior art patents, which include U.S. Pat. Nos. 3,959,419, 4,604,247 and 4,597,916, each assigned to the assignee of the present invention and U.S. Pat. No. 4,603,022 issued to Mitsubishi Jukogyo Kabushiki Kaisha of Tokyo, Japan. Another reference is seen in U.S. Pat. No. 4,499,035 assigned to Union Carbide Corporation that teaches a gas-liquid contacting tray with improved inlet bubbling means. A cross-flow tray of the type described above is therein shown with improved means for initiating bubble activity at the tray inlet comprising spaced apart, imperforate wall members extending substantially vertically upwardly and transverse to the liquid flow path. The structural configuration is said to promote activity over a larger tray surface than that afforded by simple perforated tray assemblies. This is accomplished in part by providing a raised region adjacent the downcomer area for facilitating vapor ascension therethrough.

U.S. Pat. No. 4,550,000 assigned to Shell Oil Company teaches apparatus for contacting a liquid with a gas in a relationship between vertically stacked trays in a tower. The apertures in a given tray are provided for the passage of gas in a manner less hampered by liquid coming from a discharge means of the next upper tray. This is provided by perforated housings secured to the tray deck beneath the downcomers for breaking up the descending liquid flow. Such advances improve tray efficiency within the confines of prior art structures. Likewise, U.S. Pat. No. 4,543,219 assigned to Nippon Kayaku Kabushiki Kaisha of Tokyo, Japan teaches a baffle tray tower. The operational parameters of high gas liquid contact efficiency and the need for low pressure loss are set forth. Such references are useful in illustrating the need for high-efficiency vapor/liquid contact in tray process towers. U.S. Pat. No. 4,504,426 issued to Carl T. Chuang et al. and assigned to Atomic Energy of Canada Limited is yet another example of a gas-liquid contacting apparatus. This reference likewise teaches the multitude of advantages in improving efficiency in fractionation and modifications in downcomer-tray designs. The perforated area of the tray is extended beneath the downcomer with between 0 to 25% less perforation area.

A more recent use of distillation columns is for simultaneous or stagewise fractionation in conjunction with a chemical reaction. According to Le Chatelier's Principle well known in the chemical industry, the kinetics of a chemical reaction can be improved by changing the equilibrium of the reactants with the products. For example, the mechanical designs seen in U.S. Pat. Nos. 3,629,478 and 3,634,534 illustrate distillation column reactors with catalyst in the downcomers. In the case of an exothermic reaction with gaseous product being generated, the vapor disengaging space at the entrance to the downcomer could become grossly overloaded, causing the entire tower to fail in its intended distillation function. One operational consideration is thus, venting of the gases generated within the downcomer, as well as those entrained from the tray deck. Such considerations must be addressed when maximizing tower operational efficiency.

Also according to Le Chatelier's Principle, the equilibrium of a chemical reaction can be shifted from the feed components to the products by removal of the product from the reaction mixture. In many cases, the product is removed from the residual feed by subsequent distillation. The present invention allows the reaction and production separation to be accomplished in the same vessel, allowing for a more complete chemical reaction and reduced capital costs. In cases where the reaction is exothermic, the heat of reaction can be directly applied to the product recovery step. In co-pending patent application Ser. No. 08/132,059, now U.S. Pat. No. 5,389,343, assigned to the assignee of the present invention, the distillation in conjunction with chemical reaction occurs in the vapor phase. In the present invention, the reaction step occurs in the liquid phase in a discrete section of the chemical process tower.

It would be an advantage therefore to provide a method of and apparatus for enhanced distillation utilizing liquid-phase catalytic reaction. Such an assembly is provided by the present invention wherein catalyst is disposed in a liquid-phase reaction zone of the chemical process tower. Vapor flow is diverted away from this region to permit the chemical reaction to occur solely in the liquid phase. Furthermore, the liquid-phase catalytic reaction offers the process designer a different set of operating conditions to more easily circumvent the formation of certain azeotropes.

SUMMARY OF THE INVENTION

The present invention pertains to chemical process towers and to catalyst assemblies for use therein. More particularly, one aspect of the invention includes an improved catalyst assembly for a process column of the type wherein liquid flows downwardly through random or structured packing and/or across process column trays. Vapor flows upwardly in such columns for interaction and mass transfer with the descending liquid therein. The improvement of the present invention comprises the placement of catalyst media in a liquid-phase region of the chemical process tower whereby chemical reaction of the liquid constituents is promoted in a liquid-only region thereof.

In another aspect, the present invention relates to an improved process column assembly of the type utilizing catalyst media therein and wherein liquid flows downwardly through random or structured packing and/or across process column trays while vapor flows upwardly for interaction and mass transfer with the liquid. The improvement comprises means associated with the column for the support of catalyst media in a liquid-only region of the column. This positioning of catalyst media in a liquid-only region of the tower facilitates the interaction between liquid descending downwardly through the column and the catalyst media and promotes the chemical reaction of the liquid constituents therein. The catalyst media may be supported in the column by at least one support grid secured to the column walls by attachment members extending across the column for containment of the catalyst media therein. In one embodiment, a second support grid is provided for sandwiching the catalyst media within the column.

In another aspect, the above-described invention includes a support grid disposed in a generally lower region of the column for securing the catalyst media in a lower region of the column devoted substantially to liquid flow therein, and the exclusion of vapor flow therethrough. In another aspect of the invention, the catalyst media is secured within an intermediate region of the column, with all vapor flow either above or below the catalyst media, but not therethrough. In yet another aspect of the invention, the support grid secures the catalyst media in a generally upper region of the column for permitting liquid flow therethrough to the exclusion of vapor flow therein.

In another aspect of the invention, there is provided an improved method of utilizing catalyst media within a process column. The improved method comprises the steps of disposing the catalyst media in a region of the column devoted substantially to liquid flow therein and the step of substantially excluding vapor flow through the catalyst media whereby the reaction step of the product is substantially confined to the liquid phase.

BRIEF DESCRIPTION OF THE DRAWINGS

For a more complete understanding of the present invention and for further objects and advantages thereof, reference may now be had to the following description taken in conjunction with the accompanying drawings in which:

FIG. 3 is a diagrammatic schematic of the chemical process tower of FIG. 2;

FIG. 4 is a diagrammatic schematic of an alternative embodiment of the chemical process tower of FIG. 3; and FIG. 5 is a diagrammatic schematic of yet another alternative embodiment of the chemical process tower of FIG. 3.

DETAILED DESCRIPTION OF THE PREFERRED EMBODIMENT

Figure 1:
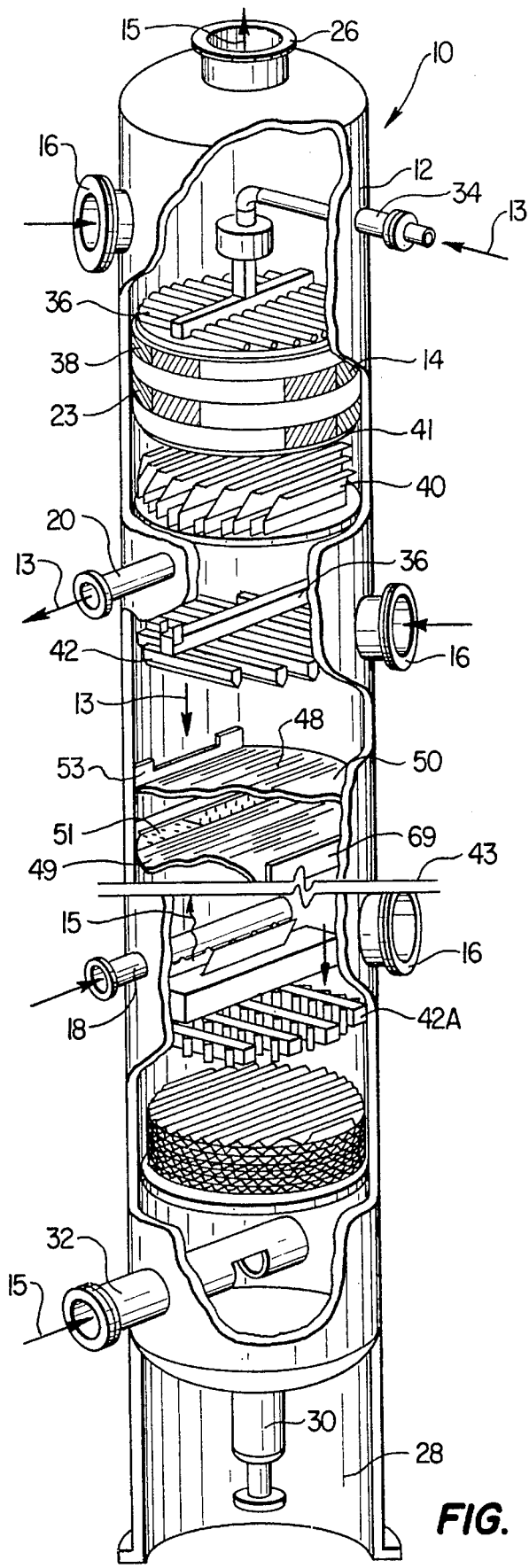
FIG. 1 is a perspective view of a packed column with various sections cut away for illustrating a variety of tower internals for reference purposes in the discussion of a chemical process tower.

Referring first to FIG. 1, there is shown a fragmentary, perspective view of an illustrative packed exchange tower or column with various sections cut away for showing a variety of tower internals. The exchange column 10 of FIG. 1 is presented for reference purposes only and does not illustrate the liquid-phase catalyst assembly of the present invention. What is shown in FIG. 1 is a cylindrical tower 12 having a plurality of packing bed layers 14 and trays disposed therein. A plurality of manways 16 are likewise constructed for facilitating access to the internal region of the tower 12. Also provided are side stream draw off line 20, liquid side feed line 18, and side stream vapor feed line or reboiler return line 32. A reflux return line 34 is provided atop the tower 12.

In operation, liquid 13 is fed into the column 10 through reflux return line 34 and side stream feed input feed line 18. The liquid 13 flows downwardly through the tower and ultimately leaves the tower either at side stream draw off line 20, or at bottom stream takeoff line 30. In its downward flow, the liquid 13 is depleted of some material which evaporates from it as it passes through the trays and packing beds, and is enriched or added to by material which condenses into it out of the vapor stream. Vapor stream 15 ascends upwardly through tower 12, as shown herein.

Still referring to FIG. 1, the exchange column 10 is diagrammatically cut in half for purposes of clarity. In this illustration, the column 10 includes a vapor outlet in overhead line 26 disposed atop the tower 12 and a lower skirt 28 disposed in the lower region of the tower around bottom stream takeoff line 30 coupled to a reboiler (not shown). Reboiler return conduit 32 is shown disposed above the skirt 28 for recycling vapor therein upwardly through the trays and/or packing bed layers 14. Reflux from condensers is provided in the upper tower region 23 through return line 34 wherein reflux is distributed throughout a liquid distributor 36 across upper packing bed 38. It may be seen that the upper packing bed 38 is of the structured packing variety. The regions of the exchange column 10 beneath the upper packing bed 38 are shown for the purpose of illustration and include a liquid collector 40 disposed beneath a support grid 41 in support of the upper packing bed 38. A liquid distributor 42, adapted for redistributing liquid 13, is likewise disposed therebeneath. A second type of distributor 42A is shown below the cut-line 43 and disposed above bed layers 14. The column 10 is presented with cut-line 43 for illustrating the fact that the tower internal s arrangement is diagrammatical only and is provided for referencing various component arrays therein.

Referring still to FIG. 1, an assembly of a pair of trays is also shown for purposes of illustration. In many instances, process columns contain only packing, only trays, or combinations of packing and trays. The present illustration is, however, a combination for purposes of discussion of the overall tower and its operation. A trayed column usually contains a plurality of trays 48 of the type shown herein. In many instances, the trays 48 are valve or sieve trays. Such trays comprise plates which are perforated or slotted in construction. Slotted trays are shown for purposes of illustration only as other styles may be used. The vapor and the liquid engage at or along the tray and, in some assemblies, are permitted to flow through the same openings in a counter-current flow arrangement. Optimally, the vapor and liquid flows reach a level of stability. With the utilization of downcomers, to be described in more detail below, this stability may be achieved with a relatively low flow rate permitting the ascending vapor to mix with the descending liquid. In some embodiments no downcomers are used, and the vapor and the liquid use the same openings, alternating as the respective pressures change.

In the present illustration, cross-flow trays 48 and 49 and downcomers 53 and 69 are shown. Tray 48 is of conventional design manifesting a conventional perforated, or slotted, surface 50. Tray 49, however, includes a raised inlet section 51 beneath downcomer 53. The apertures in the inlet section 51 can be simple perforations or directional flow vanes. Corrosion is likewise a consideration of the various elements in the packed towers and the selection of the material, design, and the fabrication of the tower internal is, in many instances, the result of such considerations. The anatomy of process columns as shown in FIG. 1 is likewise described in more detail in an article by Gilbert Chen, entitled "Packed Column Internals" appearing in the Mar. 5, 1984 edition of *Chemical Engineering*, incorporated herein by reference.

Figure 2:
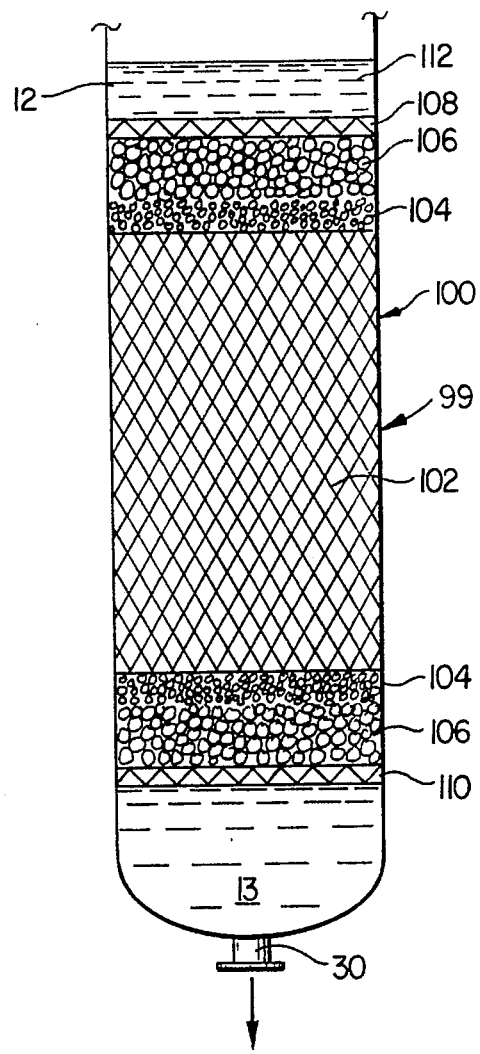
FIG. 2 is a side elevational cross sectional view of a portion of a chemical process tower illustrating one embodiment of the principles of the present invention.

Referring now to FIG. 2, there is shown a liquid-only reaction zone 99 in a lower region 100 of a tower 12. The lower region 100 of tower 12 comprises a distinct reaction zone for catalyst in accordance with the principles of the present invention. Within reaction zone 99, the catalyst media can promote a chemical reaction of liquid constituents within the tower 12, which chemical reaction can be substantially confined to the liquid phase. Region 100 is thus shown with a lower bottom stream takeoff line 30 above which liquid is disposed for passage through a catalyst media 102. Catalyst media 102 is disposed between small catalyst support media 104, which support media is sandwiched between large catalyst support media 106. Such catalyst support media is well known in the industry, an example being alumina balls of varying diameters. An upper catalyst support or holddown grid 108 is provided for upper securement of the catalyst 102 while a lower catalyst media support grid 110 is disposed above bottom stream takeoff line 30. The catalyst support grids are generally constructed of a slotted, metal grate material and can easily be designed by those skilled in the art. Typically, the support grid 110 will be attached to the tower 12 by conventional attachment means, such as welding and may extend across the entire diameter of the tower for containment of the catalyst media 102. By sandwiching the catalyst media 102 in between the support grids 108 and 110, the catalyst media is confined therebetween for interaction with the liquid 13 traveling downwardly therethrough. Any introduction of vapor would consequently occur above upper liquid level 112, which vapor entry may be provided by a reboiler return line 32, or the like, of the type shown in FIG. 1. In this manner, however, only liquid is provided in this lower region of the tower 12 to provide the above-described distinct catalyst reaction zone for liquid only. The catalyst reaction will thus take place in a distinct reaction zone, where no vapor is introduced.

There are multiple advantages provided by the configuration in FIG. 2. For example, the design permits great flexibility in the amount of catalyst that can be disposed for liquid interaction. The quantity of catalyst is not restricted to the limited size of conventional "liquid-only regions" such as downcomers. In the present configuration, the catalyst may be disposed in bulk, entirely across the cross section of the tower 12 wherein a greater volume of catalyst can be provided for interaction in a liquid-only phase. The amount and type of catalyst that is disposed within this region of the tower 12 is afforded in accordance with the necessary performance design criteria. Such performance criteria would normally include parameters such as liquid-hour space velocity (LHSV) and pressure drop. In addition, this configuration allows more precise control of the reaction by being able to heat or cool the liquid and/or vary the flow thereof through the reaction zone 99 to the precise parameters necessary for the most efficient operation of the tower 12. It also provides a less complicated mechanical design in view of the fact that the catalyst does not take up any part of the same cross sectional area as the mechanical devices necessary for passing vapor therethrough. In this respect, the tower capacity will be less restricted by eliminating the presence of catalysts in the region of any vapor flow. An additional advantage is the ease of loading and unloading the catalyst. With the catalyst disposed entirely in an isolated liquid region, the containment support may be more accessible, and servicing of this region of the tower will be simplified in comparison to installation or removal of catalyst confined within a packing structure or attached to a trayed device.

Referring now to FIGS. 3, 4 and 5 in combination, three diagrammatic schematics are presented of alternative means of applying liquid-phase reaction with select liquid-only reaction zones 99 in conjunction with mass transfer in accordance with the principles of the present invention. These three illustrations show the location of the liquid-only reaction zones 99 in select regions of a process tower 12 in accordance with the principles of the present invention. In FIG. 3, for example, the tower 12 is constructed in a manner similar to that shown in FIG. 2, wherein the reaction zone 99 is disposed entirely in the lower region 100 of the tower 12. The bottom stream takeoff line 30 is diagrammatically illustrated in a closed loop for re-introduction of liquid 98 at an upper input line 120. The upper portion 122 of tower 12 is then dedicated to counter current flow of liquid 98 and vapor 97 as representatively shown by the trays 124 which may be formed of conventional process column trays. The necessary vapor and liquid input and drawoff conduits of the type described in FIG. 1 are not shown with specificity in these particular schematic views. In FIGS. 3 and 5, however, vapor drawoff conduit 197 is shown disposed atop the tower 12 for the devices discharge of vapor 97 therefrom. Other input and drawoff conduits, will, of course, be necessary and functional systems may be designed in such a tower 12 by a man skilled in the art.

Referring now to FIG. 4, there is shown a tower 12 with the reaction zone 99 disposed in the upper region 130 of the column. The catalyst 102 disposed in region 130 is presented at a location above a top vapor stream drawoff 132 for vapor stream 97. The stream 97 is a vapor product and can be routed to an overhead condenser (not shown). In this configuration, vapor 97 can be removed to permit only liquid 98 to fill region 130. In this respect, tray 133 is preferably of solid construction (as shown by a heavy, solid line), rather than perforated since it is preferable that vapor 97 not pass beyond tray 133. A stream drawoff 30 is likewise disposed at the lower region of the tower as shown in FIG. 3 to carry liquid therefrom. Lower region 134 of tower 12 is then dedicated to the counter current flow of vapor 97 and liquid 98 as described above, wherein trays 138 are perforated and may be of the type shown in FIG. 1. The obvious design advantage in FIG. 4 is the utilization of the upper region 130 of the tower 12 for the downward flow of liquid 98 (such as reflux from a condenser) therein through catalyst 102 and providing no area for vapor 97 to be discharged. Such a design eliminates the presence of vapor 97 in reaction zone 99 in accordance with the principles of the present invention.

Referring now to FIG. 5, there is shown a process tower 12 where reaction zone 99 comprising liquid-only catalyst region 140 is disposed in an intermediate section of the tower 12. The catalyst 102 disposed in region 140 is secured above a vapor drawoff conduit 142 and beneath a vapor input conduit 144. In this manner, vapor 97 is permitted to be withdrawn beneath and injected above the catalyst region 140 to substantially prevent the flow of vapor 97 through the catalyst 102. As referenced above, a solid tray 143 is utilized above vapor drawoff conduit 142. The tray 143 (shown by heavy solid line) prevents passage of vapor 97 upwardly therethrough into the reaction zone 99. Conventional process column trays 138 may then be utilized in region 150 and 160, and counter current vapor/liquid interaction can then occur in those regions of tower 12 in accordance with the principles of the present invention. As stated above, the necessary fixtures for introducing and removing vapor 97 and liquid 98 from the tower 12 is not shown for purposes of conciseness in these diagrammatical illustrations.

It is important to note that the principle of the present invention, as described herein, is the placement of the liquid-only reaction zones in various sections of the tower dedicated to the presence of liquid only. In that regard, liquid feed lines 169, assemblies 170 and the like will be necessary for delivery and even distribution of liquid therethrough. A distributor assembly 170 is thus shown in each of the FIGS. 3, 4 and 5 for purposes of illustration. In each figure, the distributor assembly 170 is placed above the catalyst 102 in the reaction zone 99. Liquid 98 is delivered to the tower 12 by feed line 169 in each of FIGS. 3, 4 and 5. In FIG. 4, the feed line 169 is disposed immediately above the distributor assembly 170. In FIGS. 3 and 5, the liquid 98 is passed to the distributor assembly 170 from the trays above. It should be noted that the particular diagrammatical illustration of trays and the like in the vapor/liquid sections of the towers 12 are shown herein are for purposes of illustration only.

It is thus believed that the operation and construction of the present invention will be apparent from the foregoing description. While the method and apparatus shown or described has been characterized as being preferred, it will be obvious that various changes and modifications may be made therein without departing from the spirit and scope of the invention as defined in the following claims.

What is claimed is:

1. An improved method of operation of a process column utilizing catalyst media therein for promoting a chemical reaction of liquid constituents, said method of operation of said column including the steps of flowing liquid downwardly and vapor upwardly within said column for interaction and mass transfer therebetween, wherein the improvement comprises the steps of defining a liquid-only region within said column, segregating vapor flow from said liquid-only region by removing said vapor from said column and preventing said vapor from being exposed to said liquid-only region and to said catalyst media, disposing said catalyst media in said liquid-only region of said column and chemically reacting said liquid constituents one with the other in said liquid-only region in the presence of said catalyst.

2. The method as set forth in claim 1 and further including the step of constructing said process column with a plurality of trays disposed therein for facilitating the flow of liquid thereacross and the upward flow of vapor therethrough and further including the step of securing said catalyst media in a region of said column segregated from said trays.

3. The method as set forth in claim 2 and further including the step of providing first and second support grids for securement to said column, and the step of mounting said catalyst media between said grids.

\* \* \* \* \*